(12) United States Patent
Herrick

(10) Patent No.: US 9,412,196 B2
(45) Date of Patent: Aug. 9, 2016

(54) REGIONAL COMPOSITING

(71) Applicant: BROADCOM CORPORATION, Irvine, CA (US)

(72) Inventor: Jason Herrick, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 306 days.

(21) Appl. No.: 13/925,669

(22) Filed: Jun. 24, 2013

(65) Prior Publication Data

US 2014/0306957 A1 Oct. 16, 2014

Related U.S. Application Data

(60) Provisional application No. 61/812,208, filed on Apr. 15, 2013.

(51) Int. Cl.
*G06T 15/40* (2011.01)
*G06T 15/50* (2011.01)

(52) U.S. Cl.
CPC .................... *G06T 15/503* (2013.01)

(58) Field of Classification Search
CPC .......................... G06T 15/405; G06T 15/503
See application file for complete search history.

(56) References Cited

U.S. PATENT DOCUMENTS

| 6,069,633 | A * | 5/2000 | Apparao | G06T 15/405 345/421 |
|---|---|---|---|---|
| 2010/0106837 | A1* | 4/2010 | Matsubara | 709/226 |
| 2010/0158099 | A1* | 6/2010 | Kalva et al. | 375/240.01 |

* cited by examiner

*Primary Examiner* — Xiao Wu
*Assistant Examiner* — Chong Wu
(74) *Attorney, Agent, or Firm* — McDermott Will & Emery LLP

(57) ABSTRACT

A method for regional compositing includes compositing a plurality of video planes and at least one graphics plane. Graphics elements of the at least one graphics plane may be stored into a single graphics plane. A rectangle may be associated to one or more graphics elements of the single graphics plane. A Z-order of the plurality of video planes and the at least one graphics plane may be determined according to rectangular regions defined by rectangles associated with graphics elements of the single graphics plane. A pixel-by-pixel Z-order may be performed based on the determined Z-order of the plurality of video planes and the at least one graphics plane.

20 Claims, 3 Drawing Sheets

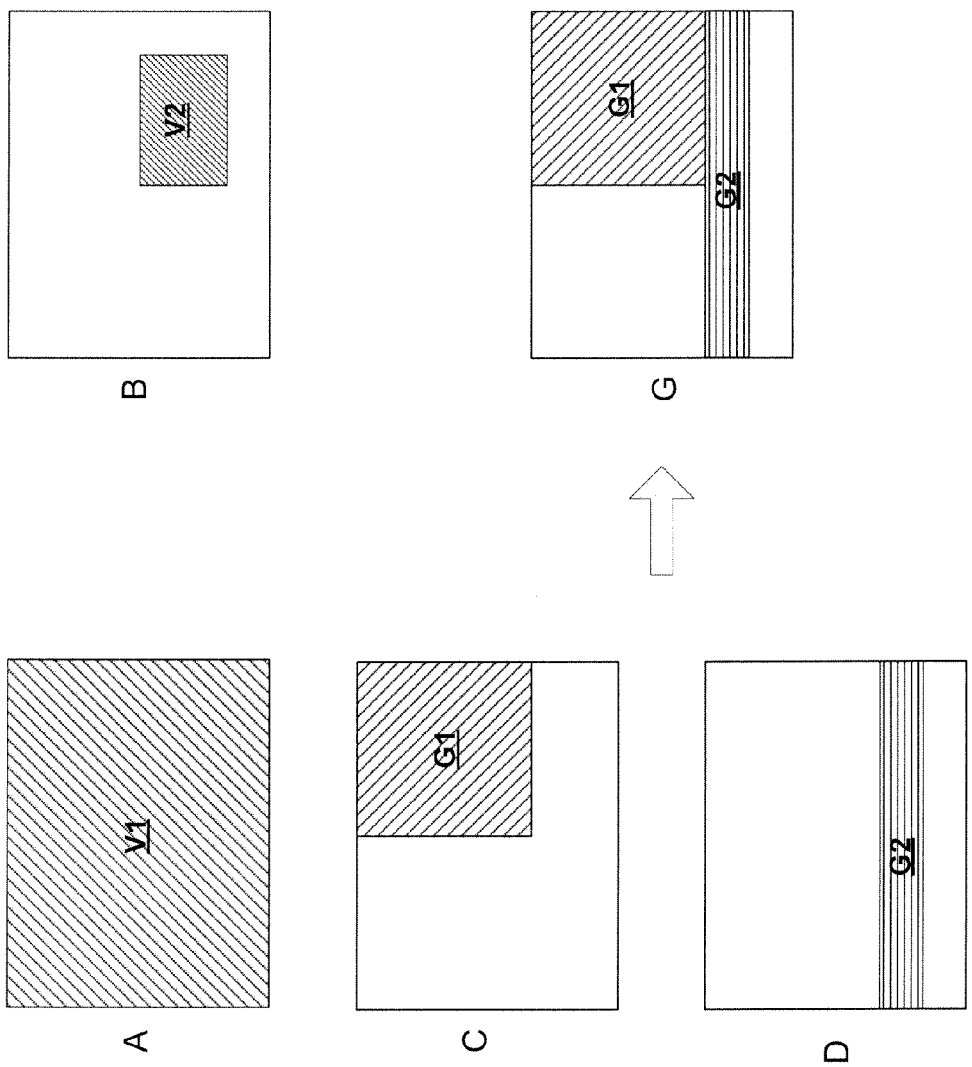

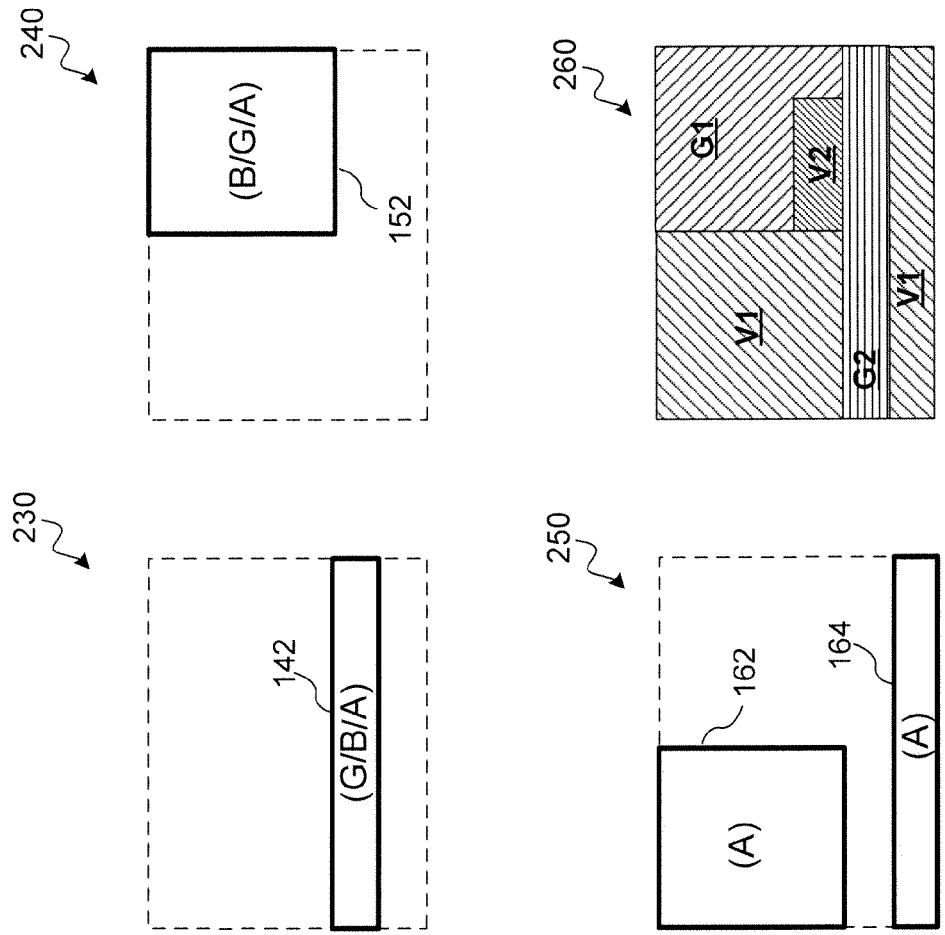
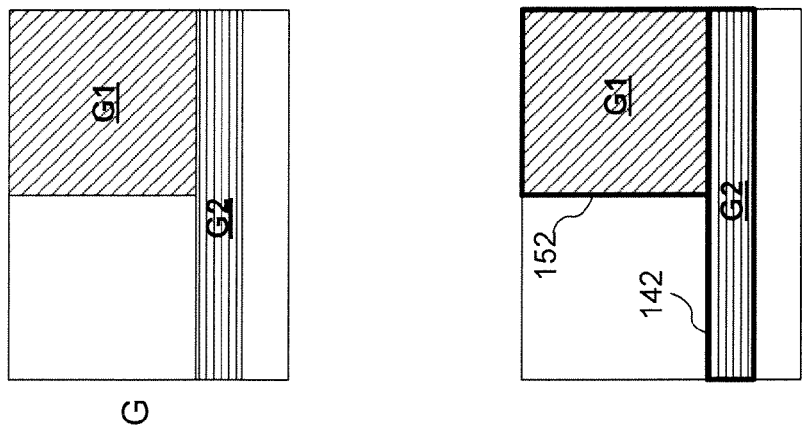
FIG. 2A
FIG. 2B

REGIONAL COMPOSITING

CROSS-REFERENCES TO RELATED APPLICATIONS

The present application claims the benefit of priority from U.S. Provisional Patent Application Ser. No. 61/812,208, filed on Apr. 15, 2013, which is hereby incorporated by reference in its entirety for all purposes.

TECHNICAL FIELD

The present description relates generally to signal processing, and more particularly, but not exclusively, to regional compositing.

BACKGROUND

Video compositing may involve blending one or more video components with a graphics background that may have multiple graphics elements. For example, the video components may include a main video that fully covers a video plane and a picture-in-picture (PIP) video that may be displayed on a portion of the video plane. The graphics background may include a graphics plane that may contain a number of graphics elements, such as images, text boxes, user interfaces (UIs), and texts in various formats. In existing set top box (STB) platforms, compositing usage cases may be quite simple. For example, the video and graphics planes may be provided and the order of the planes from top to bottom may be specified, and the blending may be performed on a per-pixel basis. This may work fine for traditional usage cases, where UI or closed captioning may be used on top of video.

The video and graphics industry, however, appears to be moving away from the traditional usage cases and are pushing for much more flexible models, especially in terms of graphics. For example, the customers may demand blending of multiple graphics surfaces and multiple video surfaces in various orders, which breaks the assumption of a single graphics plane, and if not properly handled may significantly impact the bandwidth, performance, and/or complexity.

BRIEF DESCRIPTION OF THE DRAWINGS

Certain features of the subject technology are set forth in the appended claims. However, for purpose of explanation, several embodiments of the subject technology are set forth in the following figures.

FIG. 1 illustrates an example of multiple video planes and graphics planes for regional compositing in accordance with one or more implementations.

FIGS. 2A-2B illustrate an example of regional compositing of multiple video planes and graphics planes in accordance with one or more implementations.

DETAILED DESCRIPTION

Figure 4:
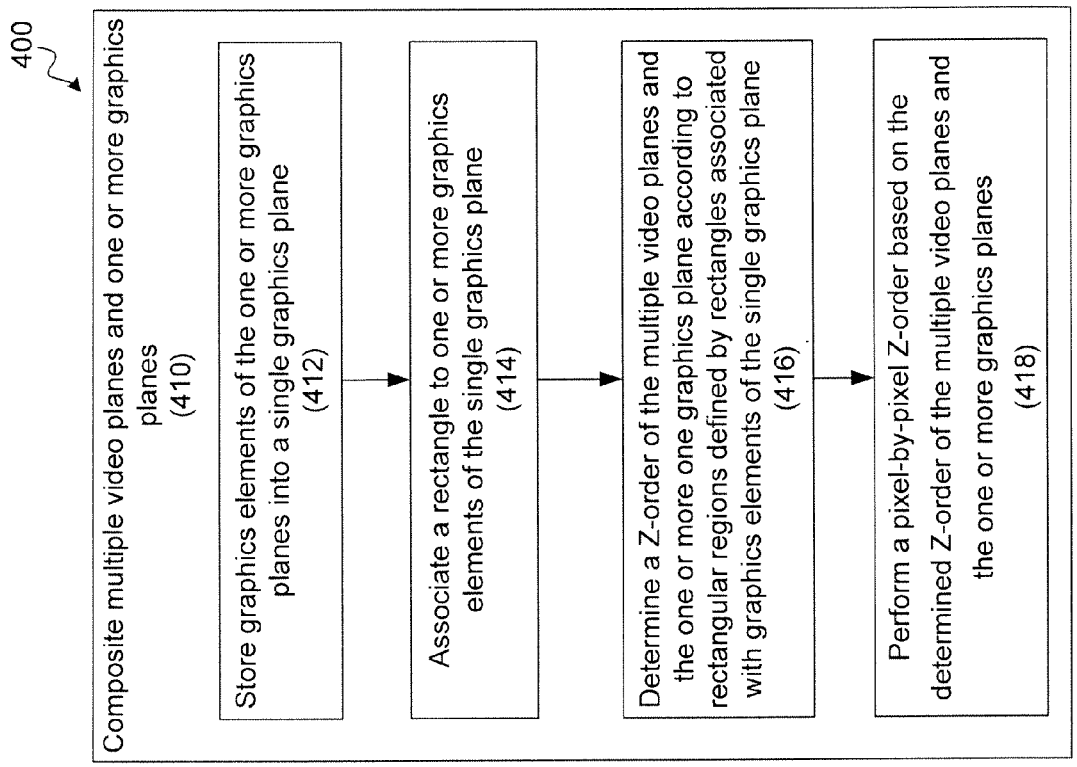
FIG. 4 illustrates an example of a method for regional compositing of multiple video planes and graphics planes in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

FIG. 1 illustrates an example of multiple video planes A and B and graphics planes C and D for regional compositing in accordance with one or more implementations of the subject technology. The video plane A may include a full-screen video plane including a primary video content V1 with an exemplary resolution of 1920×1080 pixels. The video plane B may include a secondary video content V2, which can be displayed as a picture-in-picture (PIP) video in a pre-determined position in the video plane B. The rest of the area of the video plane B, not covered by the PIP, is undefined (e.g., do not care). The graphics plane C includes a graphics element G1 and the graphics plane D includes a graphics element G2. In one or more implementations, the graphics element G1 may include a user interface (UI) and the graphics element G2 may include a closed caption. The graphics planes C and D may include more than one graphics elements, and the graphics elements (e.g., G1 and G2) may include other graphics elements, such as images, text boxes and the like. The rest of the area of the graphics planes C and D, not covered by the graphics elements G1 and G2, are undefined (e.g., do not care).

In one or more implementations, multiple graphics planes, such as graphics planes C and D may be stored in a single graphics plane G which includes all the graphics elements of the graphics planes C and D. In some aspects, two or more of the graphics elements of the multiple graphics planes may partially overlap one another. The subject technology provides for a bandwidth-efficient and flexible technique for compositing multiple video planes (e.g., video planes A and B) and a single graphics plane (e.g., single graphics plane G), storing graphics contents of a number of graphics planes (e.g., graphics planes C and D), using regional compositing.

The subject technology offers a number of advantages over the existing solutions, such as video tunnel, video as graphics, and more graphics planes. The existing solutions although may work fine for their intended purposes, but have serious limitations. For example, the video tunnel approach may require additional bandwidth for read/re-write of pixels to modify the per-pixel alpha in the graphics path, may have synchronization issues, may require a graphics blitter, and may lack flexibility in compositing video and graphics planes of different graphics resolution or color formats. The video as graphics, also known as the PC model, which uses an engine to blit sources (e.g., video or graphic) into a final graphics frame buffer, has significant bandwidth, performance, and large graphics buffer issues. The more graphics planes method uses two graphics plane and one video plane, and may deal with multiple frame buffers and increased bandwidth and memory allocation.

The subject technology, however, can determine the Z-order of video/graphics planes according to rectangular regions, which are associated with the single graphics plane (e.g., a given graphics frame buffer) and can change as the graphics frame buffer is updated. The disclosed technology may not require modification of a per-pixel alpha component, can solve the synchronization issues, and can be flexible in terms of graphics frame buffer format and updating graphics. The subject technology can make these improvements, without increased memory allocation and/or bandwidth, and may not require video operations in the graphics pipeline, as the existing solutions, such as PC model, does.

FIGS. 2A-2B illustrate an example of regional compositing of multiple video planes and graphics planes in accordance with one or more implementations of the subject technology. The subject technology may use regional compositing technique to composite a number of video planes such as video planes A and B of FIG. 1 with the single graphics plane G. The regional compositing technique may include associating a rectangle to one or more graphics elements of the single graphics plane G. For example, as shown in FIG. 2A, rectangles 142 and 152 are associated with the graphics elements G2 and G1, respectively. In one or more aspects, the rectangles may include regions beyond the borders of the graphics elements. For example, when one or more graphics elements are of non-rectangular shape (e.g., circular, polygonal, irregular, etc.) the associated rectangles may include additional regions not covered by the graphics elements.

In one or more implementations of the subject technology, each rectangle (e.g., rectangles 142 and 152) may correspond to a Z-ordering that may define the order from bottom-to-top for placing a portion of the video planes A and B and the single graphics plane G that are located inside the rectangle. The Z-order (e.g., blending order in the Z direction) of the video planes and graphics planes may be determined for each pixel of a composite frame by identifying a rectangular region that the pixel is located on and a rectangle associated with the rectangular region. A Z-order may be assigned to each rectangle. In FIG. 2B, configurations 230, 240, and 250 show rectangles 142 and 152, respectively, associated with graphics elements G2 and G1 of the single graphics plane G, and rectangles 162 and 164 identifying the regions in the single graphics plane G that are not associated with rectangles 142 and 152.

The rectangle 142, for example, may be assigned a Z-order defined by: G/B/A, where "/" is interpreted as "on top of," and the rectangle 152 may be assigned a separate Z-order defined, for example, by: B/G/A order. The assignment of the G/B/A Z-order to the rectangle 142 implies that, in the rectangular region of a composite frame 260 corresponding to the rectangle 142, the order of placement from bottom-to-top is the content of video plane A of FIG. 1, video plane B of FIG. 1, and the single graphics plane G of FIG. 1. In a rectangular region of the frame 260 corresponding to the rectangle 152, the order of placement from bottom-to-top is the content of video plane A, the single graphics plane G, and the video plane B. In the regions identified by rectangles 162 and 164, the corresponding video content V1 of video plane A may be displayed, thus the Z-order for the rectangles 162 and 164 is shown as A. As seen from the composite frame 260, in the region corresponding to the rectangle 142, the graphics element G2 of the single graphics plane G is rendered on the top of the Video plane V2 and therefore the video content V2 is not visible; whereas in the region corresponding to rectangle 152, the Video content V2 is rendered on the top of the graphics content G1, and therefore the video content V2 is visible in this area. In the other regions, the Z-order is A and only the content V1 of the video plane A is rendered.

Figure 3:
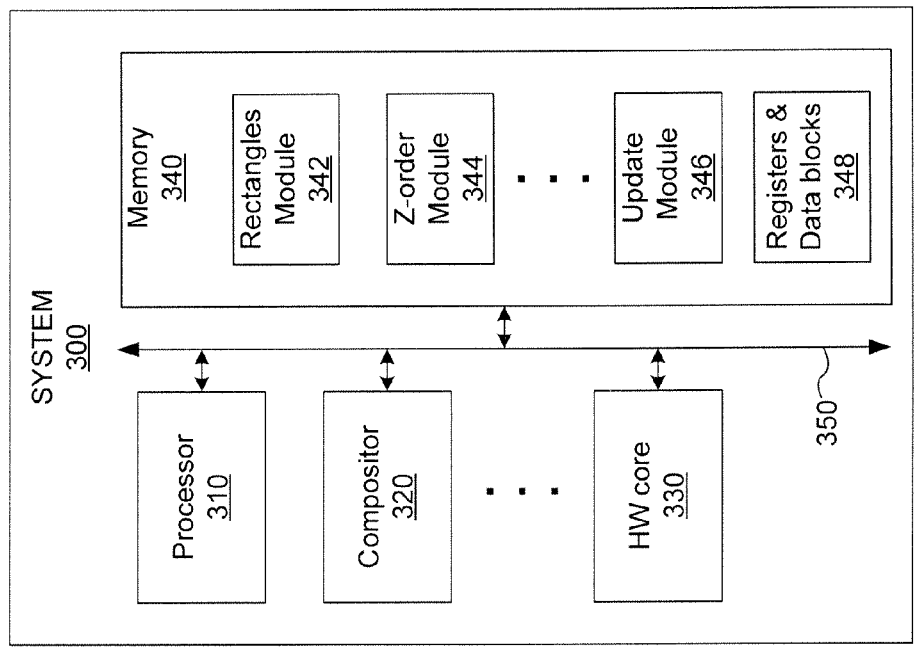
FIG. 3 illustrates an example of a system for regional compositing of multiple video planes and graphics planes in accordance with one or more implementations.

FIG. 3 illustrates an example of a system 300 for regional compositing of multiple video planes and graphics planes in accordance with one or more implementations of the subject technology. The system 300 may include a video-broadcasting system, for example, a set top box such as a Wi-Fi interface STB or a satellite digital TV (DTV) STB, a smart TV, a portable communication device, a personal computer, a Blu-ray device, or any other system or device that can process and display video content. The system 300 may include, but is not limited to, one or more processors 310, a compositor 320, one or more hardware (HW) cores 330, memory 340, and a bus 350. The memory 340 may include multiple registers and data blocks 348, storing various data, and program modules including a rectangles module 342, a Z-order module 344, an update module 346, and one or more other program modules. The one or more processors 310 may execute the program modules stored in memory 340, for example, the rectangles module 342, the Z-order module 344, and the update module 346. In one or more implementations, the one or more processors 310 or one or more of the HW cores 330 may perform the functionalities of the rectangles module 342, the Z-order module 344, and the update module 346.

In one or more implementations of the subject technology, a separate hardware core 330, such as a blitter, may combine multiple graphics planes, for example, the graphics planes C and D of FIG. 1 to form the single graphics plane G of FIG. 1. The compositor 320 may be configured to composite multiple video planes such as video planes A and B of FIG. 2 and the single graphics plane G. In one or more aspects, the single graphics plane G may be a flexible format graphics plane that is independent of an alpha channel and may include graphics elements with red-green-blue (RGB) 565 format that does not use the alpha channel. Further, the resolution of the single graphics plane G may be different than the display resolution.

The rectangles module 342 may associate rectangles 142 or 152 of FIG. 2A to graphics elements G1 and G2 of the single graphics plane G. The rectangles module 342 may store rectangles associations information (e.g., coordinates information of the region covered by each rectangle) in one or more registers and/or data blocks 348 of the memory 340. The idea of using rectangles for blending multiple video planes and graphics planes may eliminate the synchronization issues encountered in the existing solutions.

The Z-order module 344 may determine a Z-order of the video planes A and B and the graphics planes C and D according to rectangular regions defined by rectangles 142 and 152 associated with graphics elements G1 and G2 of the single graphics plane G. For example, the Z-order module may determine that the Z-order for the rectangle 142 is G/B/A and the Z-order for the rectangle 152 is B/GA. The Z order for various regions may be determined based on the content of the video plane and graphics planes (e.g., video planes A and B and the graphics planes C and D) and a configuration design of the composite frame 260. The Z-order module 344 may store the Z-order information associated with the rectangles in one or more registers and/or data blocks 348 of the memory 340, as properties of the rectangles.

The compositor 320 may be further configured to perform a pixel-by-pixel Z-order of a composite frame 260 of FIG. 2B based on the determined Z-orders of the plurality of the video planes A and B and the single graphics plane G in the composite frame 260. The compositor 320 may perform the pixel-by-pixel Z-order for each pixel of the composite frame 260, by blending corresponding pixels of the plurality the video planes A and B and the single graphics planes G in the composite frame 260 based on the placement order corresponding to the rectangle associated with the determined rectangular region for that pixel. For example, for each pixel in the regions of the composite frame 260 that corresponds to the rectangles 162 and 164 of FIG. 2B, the compositor 320 may apply the Z-order A associated with the rectangles 162 and 164, and use pixels of the video content V1 of the video plane A to render that region. For each pixel in a region of the composite frame 260 that correspond to the rectangles 142, on the other hand, the compositor 320 may apply the Z-order G/B/A associated with the rectangle 142, and may therefore blend the pixels of the video plane A, video plane B, and the single graphics plane G to render those regions.

The compositor 320 may use a blending equation: $R=\alpha S+(1-\alpha)D$ to perform blending of each pixel. In the blending equation, S and D, respectively refer to source and destination planes and define the colors of the source and destination at the pixel to be rendered, R is the resulting color from blending S and D, and $\alpha$ defines the transparency with respect to the source plane S. It is understood that source plane S is by definition overlaid on top of the destination plane D. For example, if $\alpha=0$, then R=D, that is the S plane is transparent. For example, when blending B/D/A, the compositor 320 may first apply the blending equation to the graphics plane D and the video plane A, as the respective S and D planes, to obtain a result $R_{DA}$, and then blend $R_{DA}$ as the S source plane with the video plane B as the destination plane D, using the blending equation.

The update module 346 may be configured to update graphics elements of the graphics planes C and D at a rate independent of the video planes A and B. The updated versions of the graphics planes C and D can be used by the blitter (e.g., 330) to form the updated version of the single graphics plane G, before it is used by the compositor 320. For example, the graphics elements may include closed caption text that is updated for each video frame. However, since there is no need for synchronization between graphics planes and video planes, in the disclosed technology, the update rate of the graphics planes and the video planes may be independent of one another.

The one or more HW cores 330 may include dedicated cores that execute specific functions such as decoding, scaling, 3-D rendering and so on. One or more processors 310 may be a general-purpose processor (e.g., a central processing unit (CPU)), a graphics processing unit (GPU), a microcontroller, a Digital Signal Processor (DSP), an Application Specific Integrated Circuit (ASIC), an FPGA, a Programmable Logic Device (PLD), a controller, a state machine, gated logic, discrete hardware components, or any other suitable entity that can perform calculations or other manipulations of information. The memory 340 may include random access memory (RAM), dynamic RAM (DRAM), static Ram (SRAM), flash memory, etc.

FIG. 4 illustrates an example of a method 400 for regional compositing of multiple video planes and graphics planes in accordance with one or more implementations of the subject technology. The method 400 begins with operation block 410, where compositing multiple video planes (e.g., A and B of FIG. 1) and one or more graphics planes (e.g., C and D of FIG. 1) is performed by: Storing (e.g., by 330 of FIG. 3), at operation block 412, graphics elements (e.g., G1 and G2 of FIG. 1) of the one or more graphics planes into a single graphics plane (e.g., G of FIG. 1); associating, at operation block 414, a rectangle (e.g., 142 and 152 of FIG. 2A) to one or more graphics elements of the single graphics plane; determining (e.g., by 344 of FIG. 3) a Z-order (e.g., B/G/A of FIG. 2b) of the multiple video planes and the one or more graphics planes according to rectangular regions defined by rectangles associated with graphics elements of the single graphics plane (operation block 416); and performing (e.g., by 320 of FIG. 3) a pixel-by-pixel Z-order based on the determined Z-order of the plurality of video planes and the at least one graphics plane (operation block 418).

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration," Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for regional compositing, the method comprising compositing a plurality of video planes and at least one graphics plane by:
   storing graphics elements of the at least one graphics plane into a single graphics plane;
   associating each rectangle of two or more rectangles to one or more graphics elements of the single graphics plane;
   assigning a different Z-order to each rectangle of the two or more rectangles;
   determining the Z-order of the plurality of video planes and the at least one graphics plane according to two or more rectangular regions defined by the two or more rectangles associated with the one or more graphics elements of the single graphics plane, wherein determining the Z-order of the plurality of video planes and the at least one graphics plane further comprises determining for each pixel of a composite frame a rectangular region of the two or more rectangular regions that the pixel is located on and a corresponding rectangle of the two or more rectangles; and
   performing a pixel-by-pixel Z-order blending based on the determined Z-order of the plurality of video planes and the at least one graphics plane.

2. The method of claim 1, wherein the Z-order defines a relative order from bottom-to-top for placing a portion of the plurality of video planes and the at least one graphics plane that is located inside the rectangle of the two or more rectangles.

3. The method of claim 1, wherein performing the pixel-by-pixel Z-order further comprises, for each pixel of the composite frame, blending corresponding pixels of the plurality of video planes and the at least one graphics plane based on the Z-order corresponding to the rectangle associated with the determined rectangular region of the two or more rectangular regions for that pixel.

4. The method of claim 1, wherein the graphics elements of the at least one graphics plane are updated at a rate independent of the plurality of video planes.

5. The method of claim 1, further comprising avoiding synchronization issues by associating the rectangles with graphic elements.

6. The method of claim 1, wherein the single graphics plane comprises a flexible format graphics plane that is independent of an alpha channel and includes a red-green-blue (RGB) 565 format graphics element, and wherein a resolution of the single graphics plane is different than a display resolution.

7. The method of claim 1, wherein the plurality of video planes comprise at least one of a main video plane or a picture-in-picture (PIP) video plane, and wherein the graphics elements of the at least one graphics plane comprise at least one of images, user interfaces (UIs), or text boxes.

8. The method of claim 1, wherein performing the method allows compositing without video operations in the graphics pipeline, and without increased memory allocation and additional bandwidth to perform the video operations.

9. A system for regional compositing, the system comprising:
   a compositor configured to composite a plurality of video planes and at least one graphics plane by using a single graphics plane to store graphics elements of the at least one graphics plane;
   a processor configured to:
   associate each rectangle of two or more rectangles to one or more graphics elements of the single graphics plane;
   assign a different Z-order to each rectangle of the two or more rectangles; and
   determine the Z-order of the plurality of video planes and the at least one graphics plane according to two or more rectangular regions defined by the two or more rectangles associated with the one or more graphics elements of the single graphics plane,
   wherein determining the Z-order of the plurality of video planes and the at least one graphics plane further comprises determining for each pixel of a composite frame a rectangular region of the two or more rectangular regions that the pixel is located on and a corresponding rectangle of the two or more rectangles, and the compositor is further configured to perform a pixel-by-pixel Z-order blending based on the determined Z-order of the plurality of video planes and the at least one graphics plane.

10. The system of claim 9, wherein each rectangle corresponds to a Z-order, and wherein the compositor is further configured to place from bottom-to-top a portion of the plurality of video planes and the at least one graphics plane that is located inside the rectangle based on a relative order defined by the Z-order.

11. The system of claim 9, wherein the Z-order defines a relative order from bottom-to-top for placing a portion of the plurality of video planes and the at least one graphics plane that is located inside the rectangle of the two or more rectangles.

12. The system of claim 11, wherein the compositor is configured to perform the pixel-by-pixel Z-order by blending, for each pixel of the composite frame, corresponding pixels of the plurality of video planes and the at least one graphics plane based on the Z-order corresponding to the rectangle associated with the determined rectangular region of the two or more rectangular regions for that pixel.

13. The system of claim 9, further comprising an update module configured to update graphics elements of the at least one graphics plane at a rate independent of the plurality of video planes.

14. The system of claim 9, wherein the processor is configured to associate the rectangles with graphics elements and to use the association to avoid synchronization issues.

15. The system of claim 9, wherein the compositor is configured to perform compositing without video operations in the graphics pipeline, and without increased memory allocation and additional bandwidth to perform the video operations.

16. A video-broadcasting system comprising:
   memory to store an algorithm for compositing a plurality of video planes and at least one graphics plane; and one or more processors coupled to the memory to execute the algorithm, the algorithm comprising:

storing a plurality of graphics elements of the at least one graphics plane into a single graphics plane;

associating each rectangle of two or more rectangles to at least one graphics element of the single graphics plane;

assigning a different Z-order to each rectangle of the two or more rectangles;

determining the Z-order of the plurality of video planes and the at least one graphics plane according to two or more rectangular regions defined by the two or more rectangles associated with the at least one graphics element of the single graphics plane, wherein determining the Z-order of the plurality of video planes and the at least one graphics plane further comprises determining for each pixel of a composite frame a rectangular region of the two or more rectangular regions that the pixel is located on and a corresponding rectangle of the two or more rectangles; and performing a pixel-by-pixel Z-order blending based on the determined Z-order of the plurality of video planes and the at least one graphics plane.

17. The video-broadcasting system of claim 16, wherein the Z-order defines a relative order from bottom-to-top for placing a portion of the plurality of video planes and the at least one graphics plane that is located inside the rectangle of the two or more rectangles.

18. The video-broadcasting system of claim 16, wherein:

performing the pixel-by-pixel Z-order further comprises, for each pixel of the composite frame, blending corresponding pixels of the plurality of video planes and the at least one graphics plane based on the Z-order corresponding to the rectangle associated with the determined rectangular region of the two or more rectangular regions for that pixel.

19. The video-broadcasting system of claim 16, wherein the graphics elements of the at least one graphics plane are updated at a rate independent of the plurality of video planes, and wherein the single graphics plane comprises a flexible format graphics plane that is independent of an alpha channel.

20. The video-broadcasting system of claim 16, wherein a resolution of the single graphics plane is different than a display resolution, the plurality of video planes comprise at least one of a main video plane or a picture-in-picture (PIP) video plane, and wherein the graphics elements of the at least one graphics plane comprise at least one of images, user interfaces (UIs), or text boxes.

* * * * *